United States Patent
Gokcebay et al.

(10) Patent No.: US 6,791,450 B2
(45) Date of Patent: Sep. 14, 2004

(54) NETWORKED DIGITAL LOCKER LOCK SYSTEM

(75) Inventors: Asil T. Gokcebay, Petaluma, CA (US); Yucel K. Keskin, Santa Clara, CA (US)

(73) Assignee: Security People, Inc., Petaluma, CA (US)

( * ) Notice: Subject to any disclaimer, the term of this patent is extended or adjusted under 35 U.S.C. 154(b) by 309 days.

(21) Appl. No.: 09/919,749

(22) Filed: Jul. 31, 2001

(65) Prior Publication Data

US 2003/0025590 A1 Feb. 6, 2003

(51) Int. Cl.$^7$ .............................................. G05B 19/00
(52) U.S. Cl. .................... 340/5.73; 340/5.6; 340/5.61; 340/5.64; 340/5.66; 340/568.1; 340/10.31; 340/569; 235/380; 235/375; 235/382; 700/233
(58) Field of Search ................................ 340/5.73, 5.6, 340/5.61, 5.64, 5.66, 568.1, 10.31, 569; 235/375, 380, 382; 700/233

(56) References Cited

U.S. PATENT DOCUMENTS

| | | | |
|---|---|---|---|
| 4,894,717 A | 1/1990 | Komei | 348/150 |
| 5,475,378 A | 12/1995 | Kaarsoo et al. | 340/5.6 |
| 6,010,064 A | 1/2000 | Umeda et al. | 235/375 |
| 6,323,782 B1 * | 11/2001 | Stephens et al. | 340/10.31 |
| 6,426,699 B1 * | 7/2002 | Porter | 340/568.1 |
| 6,456,900 B1 * | 9/2002 | Kakuta | 700/233 |

* cited by examiner

Primary Examiner—Aric Etienne
Assistant Examiner—Yves DaLencourt
(74) Attorney, Agent, or Firm—Thomas M. Freiburger (57) ABSTRACT

A system of locker compartments at various locations is controlled by a central system processor. A communication system from the central processor to all locations, and all lockers within a location, enables central control of rewritable locker access codes, reservation of appropriate lockers for delivery of orders, and monitoring of status of all lockers in the system. The assignment of lockers and codes can be web-based, and can be done by a vendor, a delivery company or an online customer.

16 Claims, 6 Drawing Sheets

NETWORKED DIGITAL LOCKER LOCK SYSTEM

BACKGROUND OF THE INVENTION

This invention is in the field of receiving and delivering articles utilizing automated lockers as the delivery vehicle.

In the busy lives of today's society time has become the most sought after commodity. With many two income families, receiving packages at home for deliveries and dropping off items for services such as laundry has become difficult. With no time to spare, many order goods through the use of the Internet for home delivery.

On the other hand, delivery companies also suffer, as they very often have to make several trips to deliver and obtain signature. Providing locker systems where consumers can pick up packages and drop off items located at convenient locations can alleviate this problem. These locations can be 24-hour convenience stores or daily visited metro stations, gas stations, etc. However, for a system to be successful it needs to be broad based, encompassing a multitude of vendors and delivery systems both local and national. This of course requires system access to the computers of these vendors and delivery firms. Since most companies use different computer systems and specialized software, it will require tremendous system changes in all these companies to adapt to this delivery system, rendering it impractical. The system shown of the instant invention overcomes these difficulties and provides a delivery communication system that can be accessed by both vendors and consumers both for delivery and pickup.

A variety of locker delivery systems exist. The systems described in U.S. Pat. Nos. 6,010,064 (Umeda et al.), 4,894,717 (Komei) and 5,475,378 (Kaarsoo, et al.) are believed to have some relevance to this invention. The system described in the Komei patent is designed to accept package deliveries by a number of different delivery companies, for the residents of an apartment building. A receipt is printed by the delivery person and inserted into the mailbox of the recipient, and this is later used by the recipient in retrieving the article from the locker. The system relies on the existence of a mailbox and an error free placement of the slip into the correct mailbox by the delivery person.

The system described in the Umeda patent is designed to process film dropped in by the consumer and later picked up at the same location, providing a "Drop off/Pick up" facility for a single vendor of a film developing service.

Karsoo et al. describes a system for distribution of mail in an office complex, for example, wherein the mailboxes are accessed by use of an access card. Similar to a door access control system, the card can be re-programmed (in case of dismissal of an employee, for example).

There are numerous other electronically controlled systems that allow lockers to be used for temporary storage, such as those used in airports and train stations. These systems are not designed to provide for deliveries.

SUMMARY OF THE INVENTION

The instant invention enables efficient use of a locker system that provides access to recipients of deliveries and multitude delivery and service companies and provides instant tracking of packages, pickups and deliveries. The object of the present invention is to provide a communication system supporting deliveries to recipients at convenient locations delivered by a multitude of vendors and delivery companies. Another object of the invention is to provide a convenient to use electronic reservation, control and information system for returns of goods received and drop off of serviceable items such as laundry and film development. Another object of the invention is to provide access to the locker system via multiple channels including Internet providing multi-level connectivity to the system.

DESCRIPTION OF PREFERRED EMBODIMENTS

Figure 1:
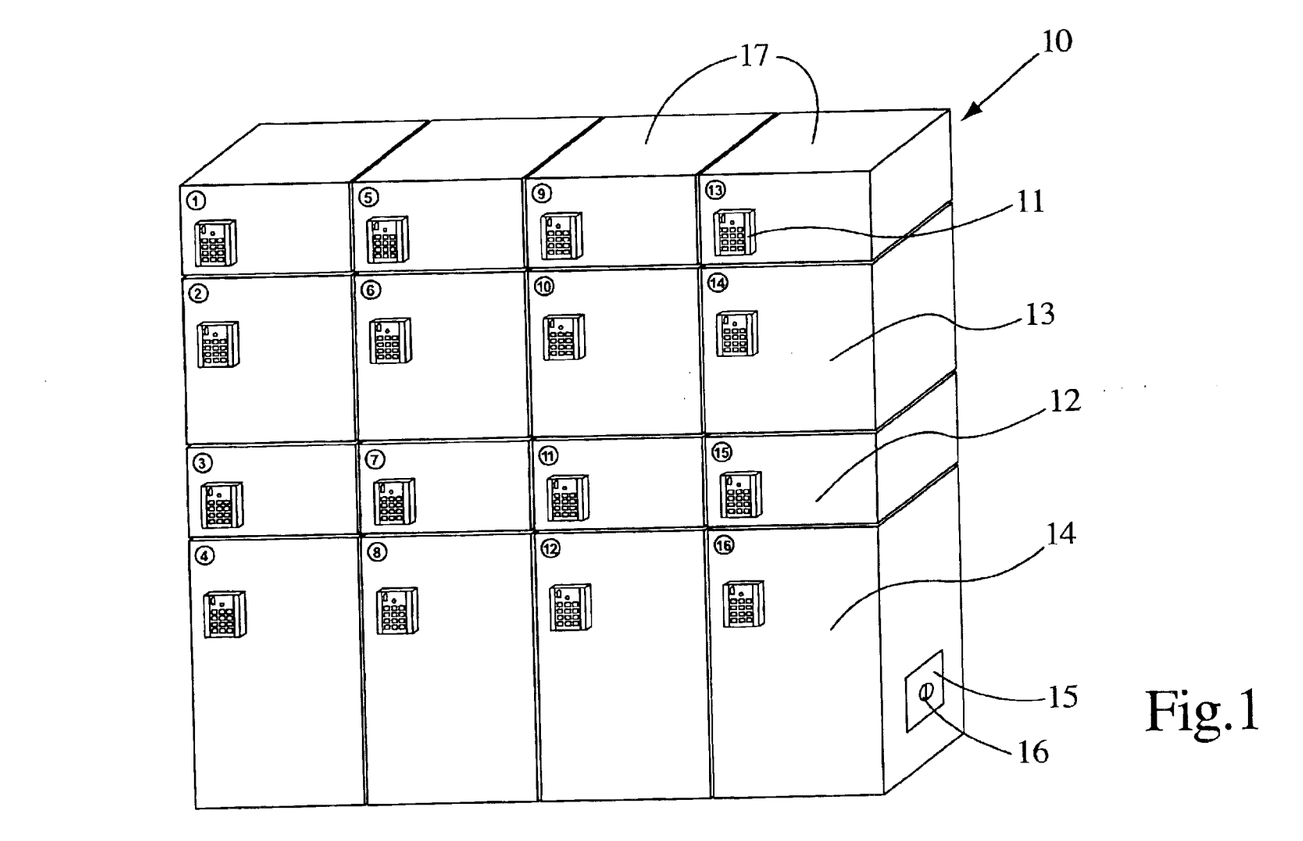
FIG. 1 shows a bank of lockers consisting of individual compartments of different size equipped with individual locks each having its own keypad for entry of data.

In accordance with a preferred embodiment, a system of the invention includes a bank of lockers 10 shown in FIG. 1 having multiple size compartments, small 12, medium 13 and large 14. There may be other sizes and different characteristics with these compartments such as refrigeration, additional security, etc. Each compartment is locked by a locking device at the door 17, operated by a keypad 11. The locking device and the operating keypad may be installed on the door 17 or the door frame (not specifically shown) controlling the opening of the door.

Figure 2:
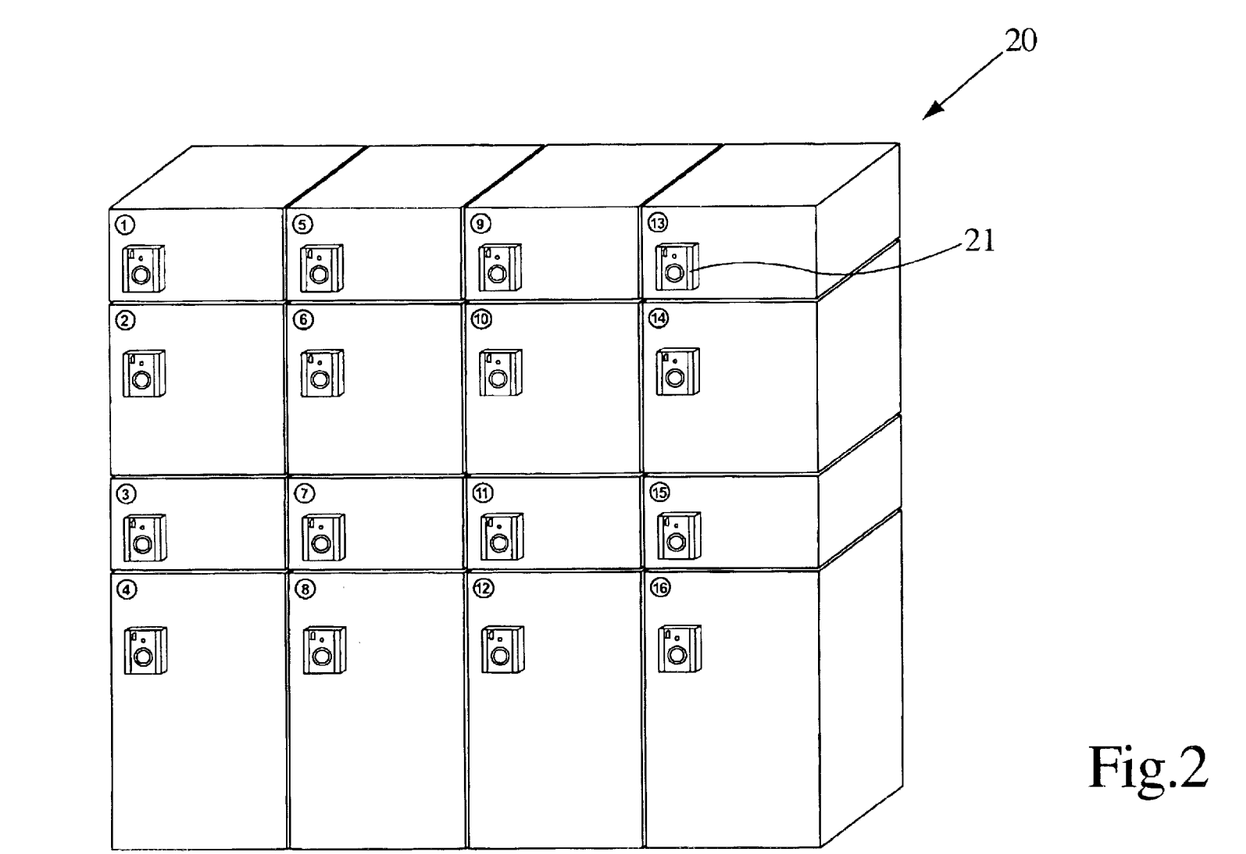
FIG. 2 shows a bank of lockers consisting of individual compartments of different size equipped with individual locks each having a receptacle designed to receive data input.

The locking device is equipped with an electrically operated blocking means that releases the door when activated by lock circuitry, upon receiving the correct entry data. The entry data maybe a predetermined number chosen by or given to the consumer who is to pick up the goods at the locker location. For example, the consumer is notified to go to a specific locker at a certain location to pick up the goods he ordered. Upon his arrival at the locker site he enters his previously chosen combination or password to the lock of the specific locker and the door opens (unlocks) for him to pick up the goods. Note that the identification data could be other than an entry of a number or password. It could be a credit card inserted into a reader or a specially issued access card for the system, biometric credential or an electronic credential such as an iButton product manufactured by Dallas semiconductor which may be touched to the lock device 21 shown in FIG. 2 on locker bank 20. Many electronic access credentials employed in door access systems may also be used such as access cards that utilize weigend or magnetic strip card technology access.

The bank of lockers 10 preferably also has an delivery company connector socket area 15 which is locked with a lock 16. The delivery companies may use the socket for accessing the lockers by identifying themselves with their special key or other identification credential. Otherwise, a special code may be used by each delivery company entered on the keypad 11 (this is further discussed below).

Figure 3:
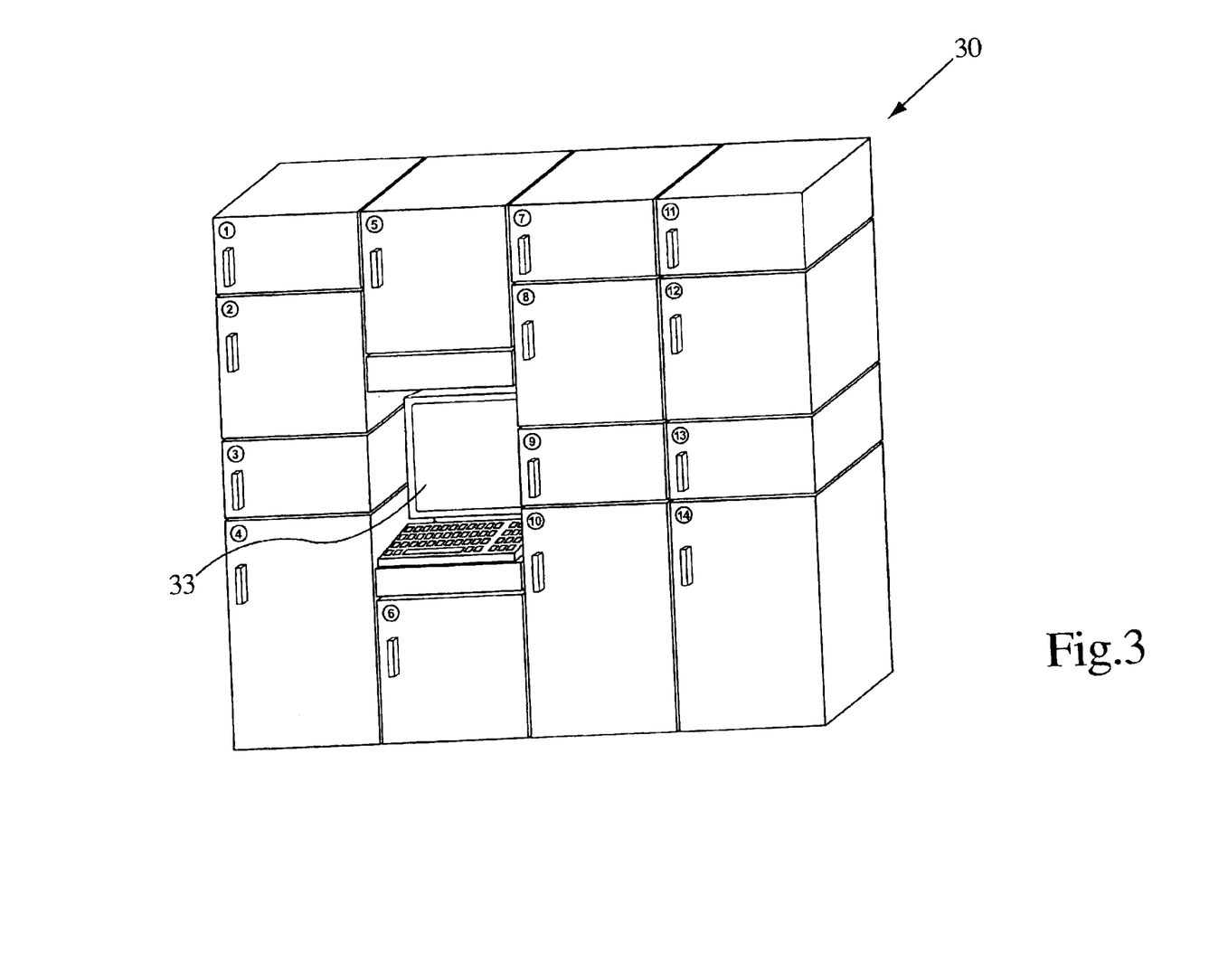
FIG. 3 shows a bank of lockers consisting of individual compartments of different size equipped with a data terminal for entry of data input.

FIG. 3 shows a bank of lockers 30 with the control console 33. In this type of lockers the access data is entered at the control console 33 for accessing individual compartments. Delivery company personnel can also use this terminal for access to the locker compartments for delivery. Upon receipt of the valid input, the door of the intended compartment is accessed.

Figure 4:
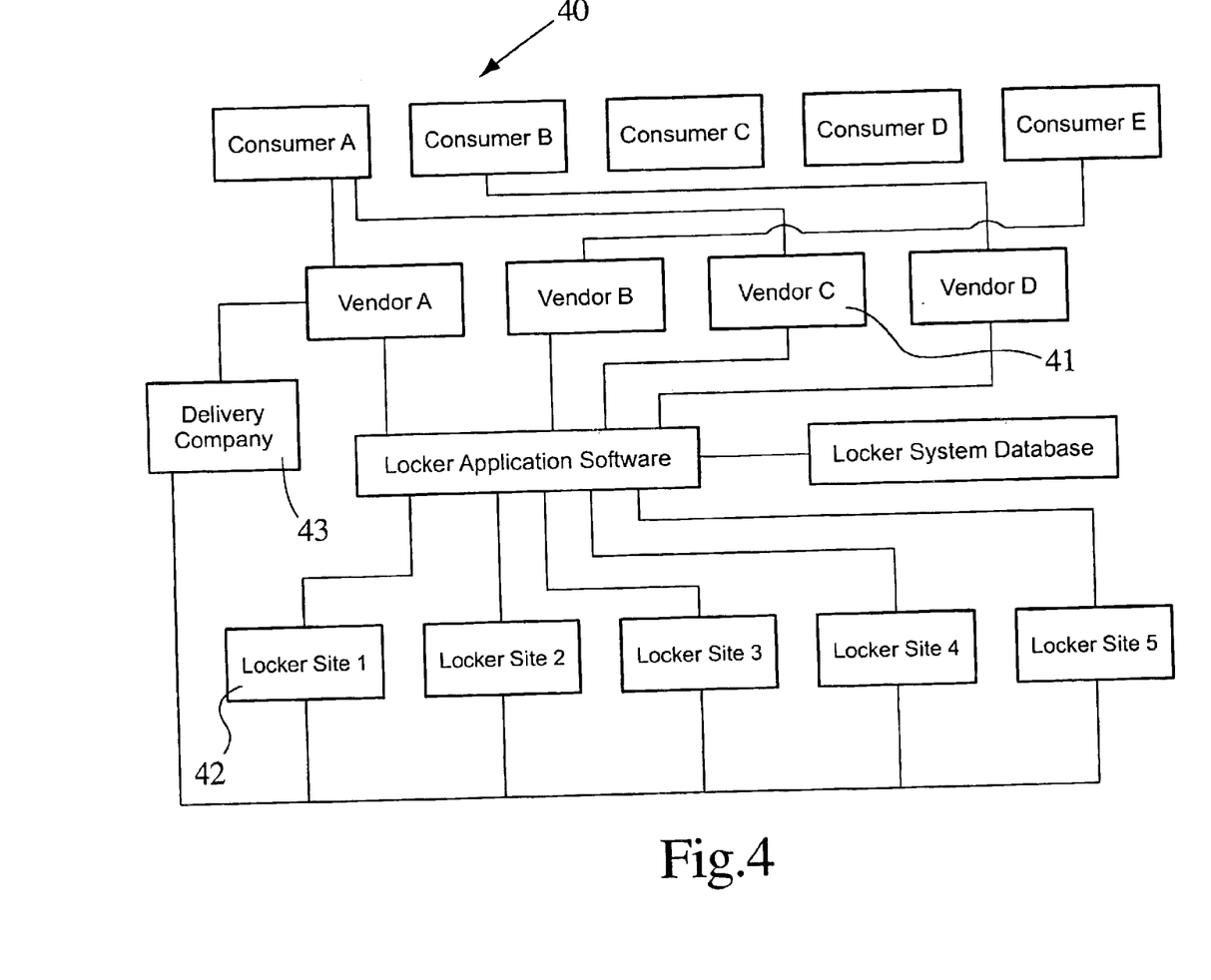
FIG. 4 is a diagram showing linking of consumers, vendors, delivery companies and locker locations.

The diagram of FIG. 4 shows connections between consumers and vendors to the locker delivery system. The consumer 40 contacts one of the vendors 41 to order goods and to have the ordered goods delivered to one of several or many locker sites 42 via a selected delivery company 43. The diagram shows the connection between the elements of the system, although numerous types of logic schemes may be used for communications serving the delivery or pick-up.

Figure 5:
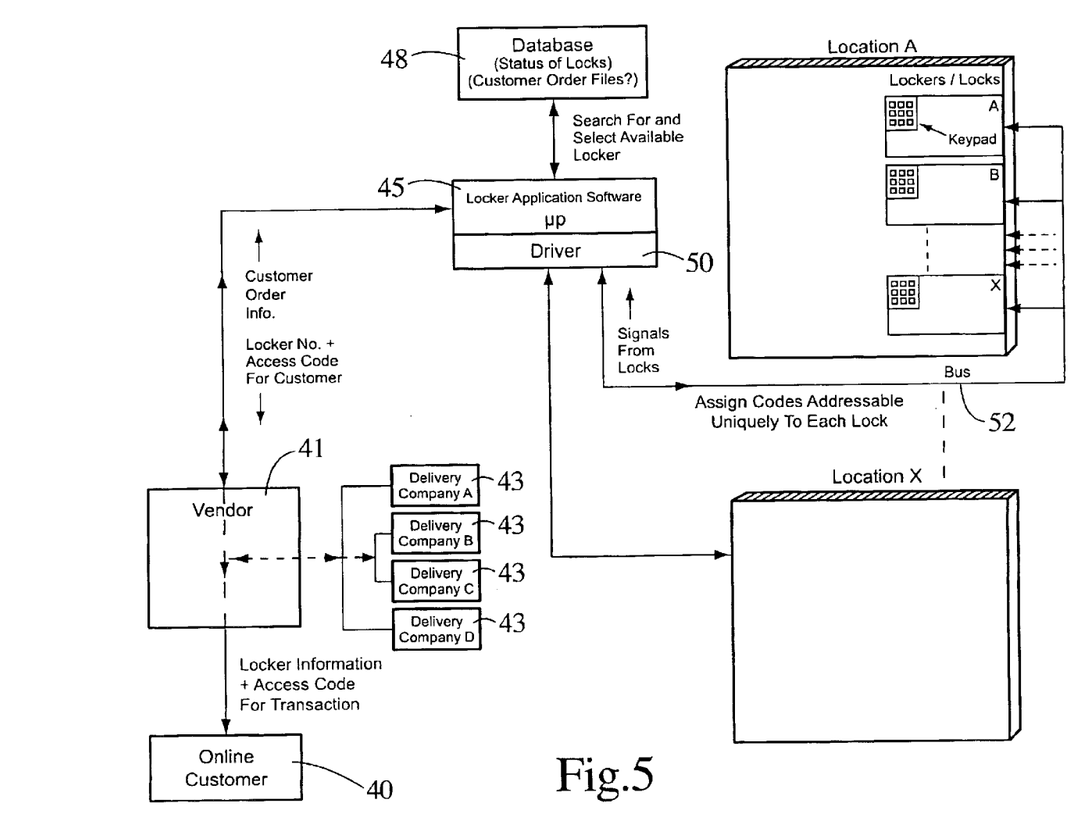
FIG. 5 is a diagram showing the elements of a single transaction and the flow of information, using web-based communications.

FIG. 5 schematically indicates the flow of information and communications involved in the process of ordering goods and specifying the locker site to which those goods are to be delivered, from the point of view of a customer. The customer 40, shown as an online customer in this example, orders goods from a vendor 41, i.e., through the vendor's internet website. The purchase is made in the usual way, normally using a credit card. During the transaction, the vendor's website either enables the customer to select a delivery company (A, B, C or D as exemplified in FIG. 5), or the vendor automatically selects the delivery company. In one preferred embodiment, the online customer while online making the purchase, also is given access to the system's microprocessor 45 and to the locker application software used by the processor. This "virtual locker" aspect enables the customer himself to select the locker site and, in some cases, the locker or locker type. FIG. 5 indicates a series of lockers, location A through location X, and shows that the system processor 45 is in communication with all locker sites. The customer 40 is given access to the locker system database 48 via the processor 45. The customer selects the locker site and may select a window of time for picking up the order. Alternatively, this information can be generated by the system and the delivery company's standard delivery time all by communication between the vendor and the website or other communication-link computer of the delivery company. Note that the system may be set up either to provide the customer with direct access to the system processor 45 and database 48, or the customer can simply designate the locker site and the vendor selects the appropriate locker size, etc. In either event, the processor consults the database and reserves the appropriate specific locker at the locker location, which will be assumed as location A for purposes of this discussion.

FIG. 5 indicates the communication between the system processor 45 and the locker site and specific lockers. As noted above, each locker has an electronic lock accessible by a code to be entered into the lock when the customer picks up an order. Each lock's code is re-programmable for each occasion of use, and all the locker locks are in a network connecting them to the locker application software via the system microprocessor 45. When an order is placed, the system processor 45 reviews the locker database 48 to the status of lockers at the selected locker site, i.e., location A in this case. The processor searches for and selects an available locker, applying any special criteria for this particular transaction (such as locker size needed for the items ordered, refrigeration for perishable goods, a locker at a low maximum height to serve handicapped, etc.). Note that the microprocessor, through the bus driver 50, has two-way communication along the bus line 52 with each of the lockers. Thus, the processors can poll each locker as to status at any time. This is preferably done on a periodic basis, automatically, with the information then sent to the locker database 48. The database 48 stores all scheduling information regarding each locker, and thus, even if a locker is currently available, it may not be available for the time period needed for this particular transaction.

The locker locations are remote from the central system processor 45. Thus, the line 52 can be land data lines, wireless or through the web (Internet).

Once the specific locker has been selected, the processor selects an access code for the locker, either randomly or via a particular operating program or using a specific access code selected by the customer or by the vendor. This is sent to the locker via the bus driver 50 and the bus 52. Although all locker locks are connected to receive these signals, the signal is addressed only to the specific locker intended and only that locker will input the content of the signal and thus receive the addressing code. The locker system database 48 stores the locker access code for the locker which has been programmed, and the window of time for which the reservation is valid. The customer 40 is then notified of the locker number, the expected delivery time and the locker access code. This can be done directly to the customer, or the vendor 41 can notify the customer. Ordinarily this notice will be by email, if it is not accomplished while the customer is still online during the ordering process. The customer is given the access code for the locker, along with the locker number and delivery time. In the locker database 48, customer identification data preferably is stored along with the access code, tied to the reserved locker in the database. As the order is made, the vendor 41 provides specific delivery instructions for the delivery company 43, preferably placing these instructions directly on the package.

Upon arriving at the locker site, location A in FIG. 5, the delivery company 43 opens the assigned locker. The locker compartment location is specified on the package by the shipper. The delivery person places the package into the correct compartment. As mentioned above, the delivery person can open the locker by using a special key (FIG. 1) or by keying in a special code, either on a terminal or on a keypad (further discussed below). The delivery person need not know the assigned code for use by the customer.

The fact of opening of the locker compartment door is recorded by the system processor 45 in the locker database 48, communicated by the bus 52. This is taken by the system as signifying that the package was placed into the locker. The time is recorded, and all this information is updated in the locker system database 48.

After the prescribed delivery time, the customer 40 goes to the locker site, location A, and to the assigned locker compartment at that location. The customer presents the access code or identification code, and is thus given access to the locker compartment to receive the ordered goods. Again, upon opening of the compartment door, the time and date of this opening is recorded via the bus 52 and the locker application software 45, and the lock for system database 48 is again updated with these data. Thus, the database will now assume that the particular delivery transaction has been concluded, and that the particular locker is again available. The information concerning pick up of the ordered goods may be delivered electronically to the delivery company, the vendor and to the customer.

A number of different operational schemes may be used for accomplishing such a delivery. For example, the locker compartment number may be communicated to the consumer via email or automated voice dialer only after the ordered goods arrive at the locker site location. In this example, the delivery person can request four compartments for four different deliveries but simultaneous deliveries, and four available locker compartment doors will open. The delivery person inserts a scanner to the socket 15 (shown in FIG. 1) which also identifies the delivery company. The delivery person scans the package label and a locker compartment identifier to identify which package was delivered to what compartment and this information can be used by the locker system application software to generate e-mail or other communication to the consumer.

In yet another scheme the users of the system are pre-registered to the system and are issued user identification. When this particular consumer purchases goods, his or her user identification, not the actual access code, is transmitted to the locker for additional security and when the user enters his or her code this is checked against the user record at the time of the transaction.

In another possible scheme the users of the system are issued some kind of tamper proof electronic identification means such as iButtons manufactured by Dallas Semiconductor. This unit positively identifies the user to the system when presented. Additionally, entry of a PIN may be required to ensure that the electronic identification means has not been stolen.

The elements of the purchase transaction listed in FIG. 5 are also used for returns or for service items such as laundry. Consumer contacts the vendor and sets up a locker for pickup and places the goods or the merchandise in the locker compartment for return or service. The serviced goods are returned to the locker site for pickup by the consumer.

Figure 6:
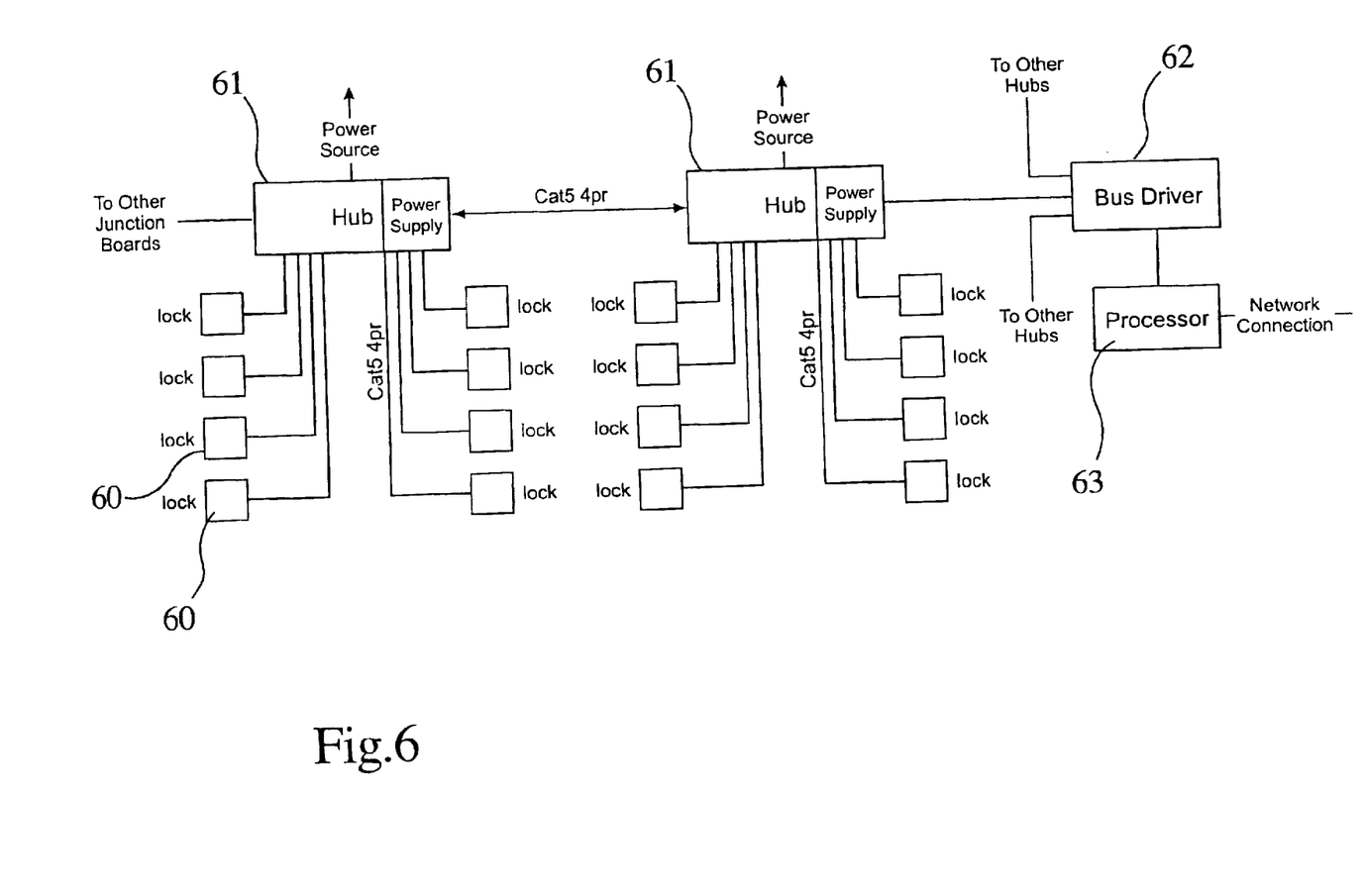
FIG. 6 shows a typical connection of locker locks of the system of the invention, preferably at a single location of many.

In all these transactions whether the vendor uses the locker system software or accesses the locker database directly by his own application this platform provides different vendors and delivery companies access to the last mile connection between the vendor and the consumer. The key element of the described delivery schemes is the real time multi party programmable lock system wherein the lock-opening data for access are updated to the locks from the locker database and the delivery data is updated to the locker database from the locks by the locker system software continuously. FIG. 6 illustrates this system, at one of a series of locker locations.

As shown in FIG. 6 locks 60 are connected on a bus line (a party line) through the use of hubs 61. The hubs 61 are also connected to one another which places all locks of the system on the same party line within the same bus line. There may be a number of bus lines supported by the bus driver 62. The locks 60 contain identification information, which identifies each lock individually. This ID number is programmed into each lock for identifying the individual locker compartment. The lock 60 also contains a micro processor and memory as well as communication circuitry for communicating with the bus driver through the bus line. As described above, locker system database may be located at a central location, or such a database may reside in the local processor 63, eliminating the central locker database (48 in FIG. 5), and in this case the central processor 45 communicates with each local database via a local processor. This local processor may be a PC. The local processor 63 sends the lock accessing data to the locks 60 and collects the opening and delivery data from the locks 60 through the bus driver 62. For example, the local processor reads the lock system data which may contain that a certain locker is to be operated by a specific code. This data is transmitted to the lock of this certain locker through the bus. When the correct entry of the pre-prescribed identification the lock 60 will open and also record the opening/delivery time. This data is collected by the local processor which then updates the locker system database. The local processor accomplishes these tasks by constantly cycling between the locker system database and the locks. The local processor reads data for each locker in the system and then contacts each lock on the bus line individually to relay the real time locking data. Although all the locks are on the same bus line, only the one that is called answers. During this communication, locking data is transmitted and confirmed to the lock and opening and delivery data, if any, is collected. At the end of this transaction the opening/delivery data is transmitted to the locker system database. The communication between the locker database and the locker sites and the bank of lockers may be established by numerous methods including LANs or WANs, wireless networks or through internet. The local processor and bus driver may be combined into a single unit. As noted above, the local processor may be web driven allowing each locker site to be directly connected and controlled through the web, by the central processor 45.

Although there is advantage to use of a bus line for local communication at the locker site, reducing the number of cables, bus lines have a disadvantage in that if an individual locker unit malfunctions or causes a short on the communication line, all units will be down until repair of the short. An alternative is a self-testing hub unit capable of isolating shorted units from the communication circuitry.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. An electronic lock network for assigning and controlling use of lockers for a distribution system, comprising:

a series of lockers capable of storing goods for users to pick up or as delivered by users, the lockers being at one or more locations known to users, each locker having an electronic lock accessible by a code presented by a user picking up or delivering items, and the lock being programmable to a selected code for access, a network connecting the locker locks, including signal carrying means for carrying signals to and from each electronic lock in the network, a microprocessor controlling the network, connected to the signal carrying means and capable of assigning to a selected locker lock an access code for self-service access by a user, and capable of sending signals uniquely to and receiving signals uniquely from each lock on the signal carrying means, including the assigned access code, effective to set the lock to that code, a locker database connected to the microprocessor, the locker database storing status information on locks in the system, such that the microprocessor can retrieve information from the locker database as to the status of each lock and can transmit information to the database to assign lockers and access codes as new orders are made, and the microprocessor and signal carrying means including means for determining occupied or available status of each locker lock and for receiving a signal indicating when a lock has been opened, and storing this information in the locker database.

2. The electronic lock network of claim 1, wherein the locker database also stores information on the size of each locker in the network, and its height above a floor, so as to be capable of accommodating orders of different sizes and users with special requirements.

3. The electronic lock network of claim 1, wherein the access code is pre-selected and specified in information entered into the microprocessor when an order is initiated.

4. The electronic lock network of claim 3, wherein a user's credit card code comprises the access code for the locker lock containing the user's order, the credit card code being input to the microprocessor and sent by the microprocessor to the locker lock to set the lock, and including reader means at or near the customer locker for enabling a customer to swipe a credit card through the reader means to allow access to the lock, when the correct credit card is used.

5. The electronic lock network of claim 1, wherein the microprocessor includes means for assigning a time duration during which the locker lock should be accessed by a user for retrieving stored items after such items have been placed in a locker, and including means in the microprocessor for sending a signal to an appropriate entity if the microprocessor has not received a signal that the locker has been opened within a designated duration of time after placement of the items in the locker.

6. The electronic lock network of claim 1, wherein the microprocessor and signal carrying means include locker scanning means for monitoring the status of each locker lock at pre-selected intervals, and for updating the locker database at such selected intervals with current information on each lock's status.

7. The electronic lock network of claim 1, wherein the network includes a series of unique hand held electronic identification devices registered uniquely to users, wherein the locker locks include contact readers for the electronic identification devices, and wherein the code assigned by the microprocessor to a particular locker lock comprises the unique code for a designated user as on the user's hand held electronic identification device.

8. The electronic lock network of claim 1, wherein the network includes a series of unique hand held accessing proximity devices registered uniquely to users, wherein the locker locks include proximity readers for the hand held accessing proximity devices, and wherein the code assigned by the microprocessor to a particular locker lock comprises a unique code for a designated user as on the user's hand held accessing proximity device.

9. The electronic lock network of claim 1, wherein the network includes a series of unique hand held electronic identification devices registered uniquely to users, wherein the locker locks include both keypads as accessing devices and readers for the electronic identification devices as access devices, and wherein the code assigned by the microprocessor to a locker lock can comprise the unique code for a designated user as on the user's electronic identification device.

10. The electronic lock network of claim 1, wherein the microprocessor, on receiving a new order for use of a locker, assigns an effective time for usage of the locker, in which the locker can be opened for delivery and for pickup.

11. The electronic lock network of claim 1, wherein the microprocessor, on receiving a new order for use of a locker, assigns a time limit for opening of the locker by a user, during which time limit the user can access the lock more than once, the time limit applying from the instant of first opening of the locker by the user.

12. The electronic lock network of claim 1, wherein the microprocessor includes means for receiving information concerning special needs of a user, and for setting the time period for access by a user to a particular lock longer for people with disabilities.

13. The electronic lock network of claim 1, wherein the signal carrying means between the microprocessor and the locker locks comprises communication over the internet.

14. The electronic lock network of claim 1, wherein the signal carrying means between the microprocessor and the electronic locker locks is provided by wireless communication.

15. An electronic lock network for assigning and controlling use of lockers for a distribution system, comprising:

a series of lockers capable of storing goods for users to pick up or as delivered by users, the lockers being at one or more locations known to users, each locker having an electronic lock accessible by a code presented by a user picking up or delivering items, and the lock being programmable to a selected code for access, a network connecting the locker locks, including signal carrying means for carrying signals to and from each electronic lock in the network, a microprocessor controlling the network, connected to the signal carrying means and capable of assigning to a selected locker lock an access code for self-service access by a user, and capable of sending signals uniquely to and receiving signals uniquely from each lock on the signal carrying means, including the assigned access code, effective to set the lock to that code, and a locker database connected to the microprocessor, the locker database storing status information on locks in the system, such that the microprocessor can retrieve information from the locker database as to the status of each lock and can transmit information to the database to assign lockers and access codes as new orders are made.

16. The electronic lock network of claim 15, wherein the series of lockers are in groups located at separate geographical locations.

* * * * *